(12) United States Patent
Kobayashi

(10) Patent No.: US 11,546,523 B2
(45) Date of Patent: Jan. 3, 2023

(54) IMAGE PROCESSING SYSTEM, IN-VEHICLE CAMERA SYSTEM WITH IMAGE PROCESSING SYSTEM, AND VEHICLE WITH CAMERA SYSTEM

(71) Applicant: DENSO CORPORATION, Kariya (JP)

(72) Inventor: Kazuhiko Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/645,427

(22) Filed: Dec. 21, 2021

(65) Prior Publication Data

US 2022/0201189 A1 Jun. 23, 2022

(30) Foreign Application Priority Data

Dec. 23, 2020 (JP) .............................. JP2020-213918

(51) Int. Cl.
*H04N 5/235* (2006.01)
*B60R 1/10* (2006.01)
*G06T 5/00* (2006.01)
*H04N 5/232* (2006.01)

(52) U.S. Cl.
CPC ............. *H04N 5/2355* (2013.01); *B60R 1/10* (2013.01); *G06T 5/003* (2013.01)

(58) Field of Classification Search
CPC ............. H04N 5/2355; H04N 5/23229; H04N 5/2352; H04N 5/2351; B60R 1/10; G06T 5/003
See application file for complete search history.

(56) References Cited

U.S. PATENT DOCUMENTS

| | | | |
|---|---|---|---|
| 2016/0344977 A1* | 11/2016 | Murao | G06V 20/56 |
| 2018/0097984 A1 | 4/2018 | Kobayashi et al. | |
| 2018/0284398 A1* | 10/2018 | Furutake | H04N 5/2259 |
| 2019/0080460 A1* | 3/2019 | Nishijima | G06T 7/269 |
| 2020/0029052 A1 | 1/2020 | Murao et al. | |
| 2020/0090322 A1* | 3/2020 | Seo | G06N 3/084 |
| 2021/0082090 A1* | 3/2021 | Herman | G06T 5/008 |

FOREIGN PATENT DOCUMENTS

JP 2019-134210 A 8/2019

* cited by examiner

*Primary Examiner* — Christopher K Peterson
(74) *Attorney, Agent, or Firm* — Maschoff Brennan

(57) ABSTRACT

An image processing device is enabled to appropriately restore a contrast of a camera image. An in-vehicle camera has an image capture unit that captures images of surroundings of a vehicle through a windshield of the vehicle. A hood is disposed below the image capture unit and is present within an angle of view of the image capture unit. The control unit includes a luminance acquirer that acquires a luminance parameter indicating a degree of luminance of the hood appearing in a camera image, a whitish blur degree calculator that calculates a degree of whitish blur of the camera image caused by a reflection of natural light by the hood and the windshield in accordance with the luminance parameter, and a contrast corrector that corrects a contrast of the camera image in accordance with the whitish blur degree.

9 Claims, 8 Drawing Sheets

IMAGE PROCESSING SYSTEM, IN-VEHICLE CAMERA SYSTEM WITH IMAGE PROCESSING SYSTEM, AND VEHICLE WITH CAMERA SYSTEM

CROSS-REFERENCE TO RELATED APPLICATION

This patent application is based on and claims priority to Japanese Patent Application No. 2020-213918, filed on Dec. 23, 2020 in the Japan Patent office, the entire disclosure of which is hereby incorporated by reference herein.

BACKGROUND

Technical Field

The present disclosure relates to an image processing system, an in-vehicle camera system with the image processing system, and a vehicle with the in-vehicle camera system.

Related Art

In a known camera system employed in vehicles, a camera is disposed close to an inside of a windshield in the vehicle. In such a system, since a dashboard is reflected by an inner surface of the windshield and the reflection mixes with a camera image when forward surroundings are captured by the camera, a hood is generally attached to the camera to prevent the image of the dashboard from being mixed with the camera image. Hence, in a known hooded camera, the hood being present in the camera image is detected (i.e., determined) based on the camera image, and only an image area where the hood is absent is extracted from the camera image to be used when the hood is present in the camera image. Hence, according to the known hooded camera, an amount of video data transmitted externally is reduced even if the quality of the appearance of the video is maintained.

Further, when a hooded camera is disposed close to the inside of the windshield of the vehicle, natural light is reflected by both the hood and the inner side of the windshield in this order. As a result, a camera image as a whole is highly likely to be blurred in white thereby generating a whitish image resulting in deterioration of a contrast of the camera image. Hence, a technology of avoiding degradation of the contrast caused by such whitish blur is called for in the in-vehicle camera with the hood.

Accordingly, the present disclosure has been made to address and resolve the above-described problems, and it is an object of the present disclosure to provide an image processing system capable of appropriately restoring a contrast of a camera image.

SUMMARY

Accordingly, one aspect of the present disclosure provides a novel image processing system used with an in-vehicle camera system that includes: an image capture unit to capture images of surroundings of a vehicle as camera images through a windshield of the vehicle; and a hood to prevent an interior of the vehicle from being reflected in the windshield and being captured by the image capture unit together with the surroundings of the vehicle. The hood is disposed below the image capture unit and is present within an angle of vision of the image capture unit. The image processing system includes: a luminance parameter acquirer to acquire a luminance parameter indicating a degree of luminance of an image of a hood reflected in the camera image; and a whitish blur degree calculator to calculate a degree of whitish blur of the camera image as a whitish blur degree in accordance with the luminance parameter. The whitish blur is caused when natural light is reflected by both the hood and the windshield. The image processing system further includes a contrast corrector to correct a contrast of the camera image in accordance with the whitish blur degree.

Another aspect of the present disclosure provides a novel in-vehicle camera system that comprises: an image capture unit to capture images of surroundings of a vehicle as camera images through a windshield of the vehicle; and a hood to prevent an interior of the vehicle from being reflected in the windshield and being captured by the image capture unit together with the surroundings of the vehicle. The hood is disposed below the image capture unit and is present within an angle of vision of the image capture unit. The camera system also includes the above-described image processing system.

Yet another aspect of the present disclosure provides a novel vehicle having an automatic driving function and a drive recorder. The vehicle includes a camera system disposed in a cabin close to a windshield, and the above-described camera system.

Hence, according to one embodiment of the present disclosure, the hood is attached to the camera and is present within an angle of view of the image capture unit. Then, the luminance parameter indicating a degree of luminance of the hood reflected to the camera image is acquired. Further, in accordance with the luminance parameter of the hood, a degree of whitish blur (i.e., whitish blur degree) of a camera image caused by natural light reflected by both the hood and the windshield is calculated. Then, a contrast of the camera image is corrected in accordance with the degree of the whitish blur. Here, the degree of whitish blur is proportional to an intensity of reflection of natural light in the hood. Also, the luminance parameter of the hood in the camera image (i.e., an image of the hood) is proportional to the intensity of the reflection of the hood. Hence, the contrast of the camera image can be appropriately restored by correcting the contrast by the degree of whitish blur calculated in accordance with the luminance parameter of the hood.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
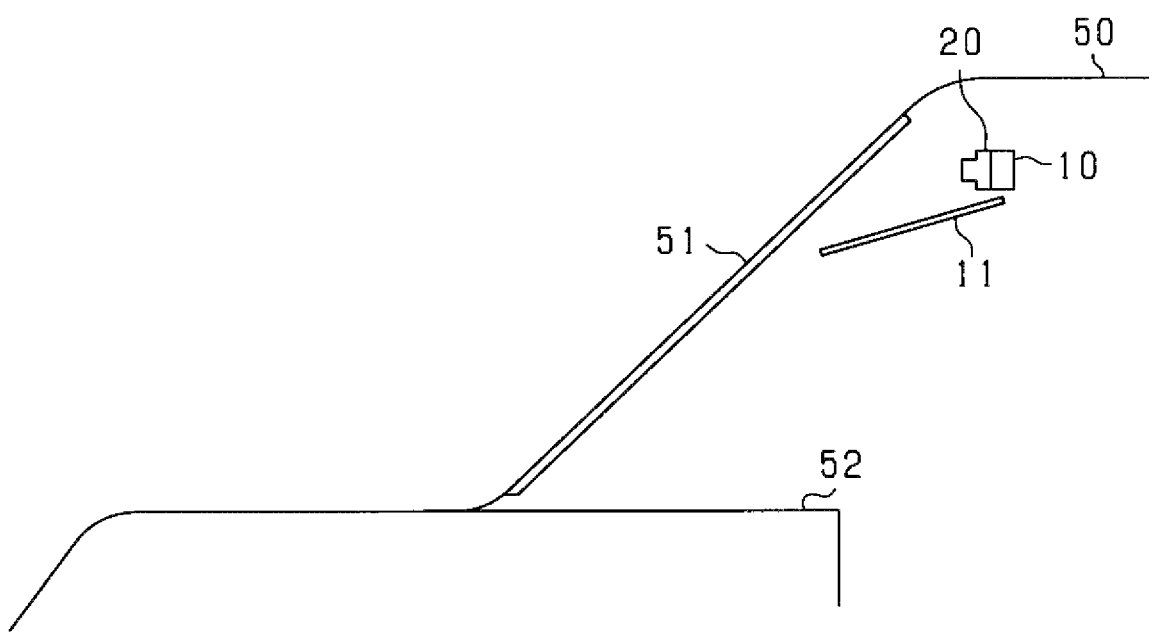
FIG. 1 is a diagram schematically illustrating a configuration of a camera system mounted on a vehicle according to one embodiment of the present disclosure.

Referring now to the drawings, wherein like reference numerals designate identical or corresponding parts throughout the several views thereof, and to FIG. 1, an outline of a camera system will be initially described. The camera system of this embodiment is mounted on a vehicle and captures images of surroundings in front of the vehicle by using an in-vehicle camera.

FIG. 1 illustrates a configuration of the camera system mounted on the vehicle 50. As shown, a camera 10 is disposed close to an inner side of a windshield 51 in the vehicle 50. The camera 10 has an image capture unit 20 that captures images of surroundings (e.g., a scenery) of the vehicle 50. The camera 10 serves as a front camera and is positioned to capture a given region in front of the vehicle 50 over the wind shield 51. Thus, the given region of the surroundings serves as an image capturing region. Accordingly, when a dashboard 52 or the like positioned in a vehicle interior is reflected by the windshield 51, an image of the dashboard 52 is highly likely to be included in a camera image captured by the image capture unit 20. Hence, a hood 11 is generally disposed on a front lower side of the image capture unit 20 to prevent the image of the dashboard 52 or the like from appearing in the image. The hood 11 may be integral with or separately from a housing of the camera 10.

Figure 2:
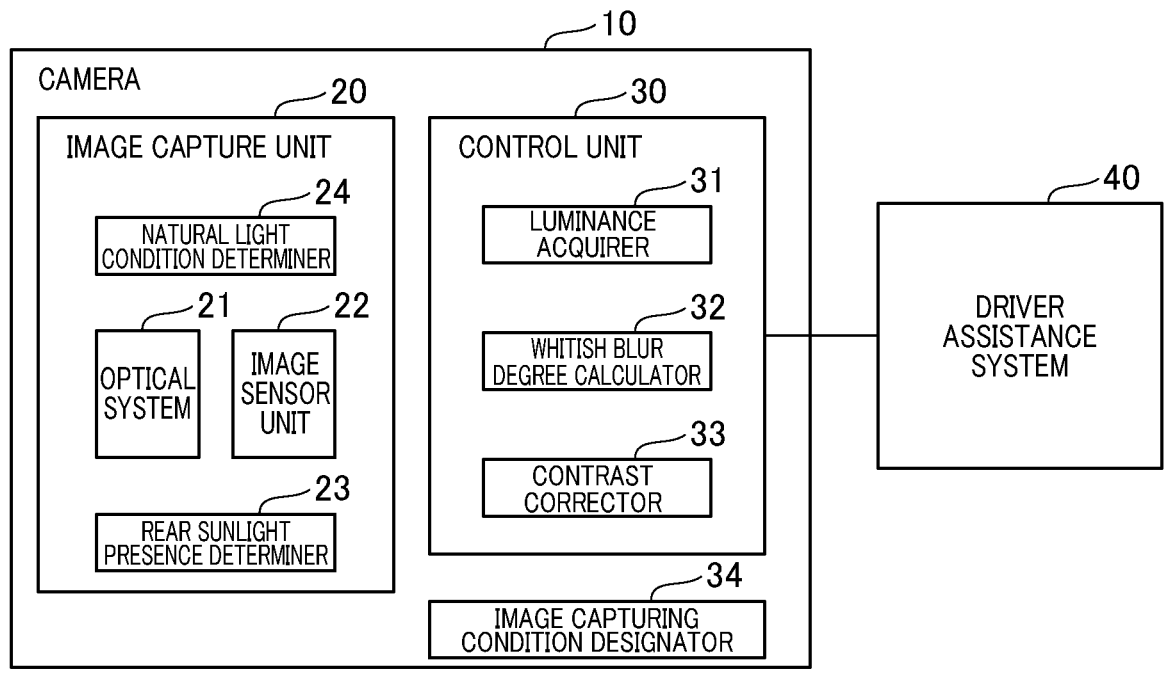
FIG. 2 is a block chart principally illustrating a configuration of a camera system according to one embodiment of the present disclosure.

FIG. 2 illustrates a configuration of the camera 10. The camera 10 includes an image capture unit 20 and a control unit 30. The image capture unit 20 includes an optical system 21 and image sensor unit 22.

The optical system 21 includes a lens, an aperture or a diaphragm and a shutter or the like (not shown). The lens focuses visible light incident thereto on the image sensor unit 22. The diaphragm adjusts a quantity of visible light having passed through the lens in accordance with a diaphragm value. The visible light having passed through the diaphragm enters the image sensor unit 22. The shutter opens and closes at a given shutter speed during image capturing. With this, an exposure process is performed in accordance with the shutter speed during an exposure period.

The image sensor unit 22 may include a CMOS (Complementary Metal Oxide Semiconductor) sensor or multiple CCD (Charge Coupled Device) sensors and the like. The image sensor unit 22 outputs an electrical signal indicating intensity of the visible light incident thereto. The electrical signal is then amplified with a given gain and is output to the control unit 30.

The control unit 30 is a microcomputer including a CPU (Central Processing Unit), a ROM (Read Only Memory), and a RAM (Random Access Memory) or the like. The control unit 30 generates image data in accordance with the electrical signal output from the image sensor unit 22. The control unit 30 designates (i.e., determines) image capturing conditions for operating the image capture unit 20. The image capturing condition may include a shutter speed, a diaphragm value, and a gain for amplifying the electrical signal output from the image sensor unit 22 or the like. The image capture unit 20 captures images in accordance with the image capturing conditions designated by the control unit 30. Hence, the control unit 30 acts as an image processing system in the present disclosure.

Further, the vehicle 50 includes a driver assistance system 40 that performs driver assistance control for controlling the vehicle. The driver assistance system 40 receives image data from the control unit 30 and performs various driver assistance control activities based on the image data. Specifically, the driver assistance system 40 recognizes demarcation lines, such as white lines, etc., other vehicles, and pedestrians based on images of the surroundings in front of the vehicle. The driver assistance system 40 also recognizes bicycles and other objects, such as structures, etc., based on the image data. Then, based on these recognition results, the driver assistance system 40 appropriately performs the driver assistance controls including lane keeping control to suppress lane deviation by an own vehicle, pre-crash safety control to avoid collision with objects, and tracking control of tracking other vehicles preceding the own vehicle to control the own vehicle to follow the other vehicles or the like.

Figure 3:
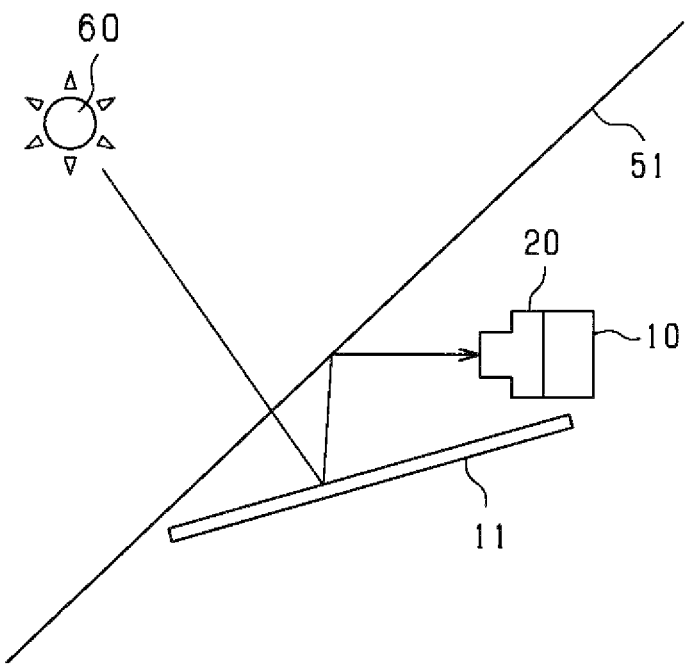
FIG. 3 is a side view illustrating the camera system from one side thereof according to one embodiment of the present disclosure.

With the above-described configuration shown in FIG. 1, natural light is reflected first by the hood 11 and then by the inner side of the windshield 51 as the hood 11 is disposed below the image capture unit 20 close to the inside of the windshield 51 in the vehicle 50. Hence, a phenomenon, in which a camera image captured by the image capture unit 20 is blurred in white occurs when viewed as a whole. Specifically, a whitish image is generated. That is, as shown in FIG. 3, when a light source 60 such as the sun, etc., is located ahead of the vehicle 50, light from the light source 60 passes through the windshield 51 and is reflected by a surface of the hood 11. Then, the light reflected by the surface of the hood 11 reaches and is reflected by the inner side of the windshield 51. Then, the light reflected by the inner side of the windshield 51 enters the image capture unit 20, thereby blurring the camera image in white (hereinbelow simply referred to as whitish blur). As a result, the whitish blur is likely to decrease a contrast of the camera image.

Figure 4:
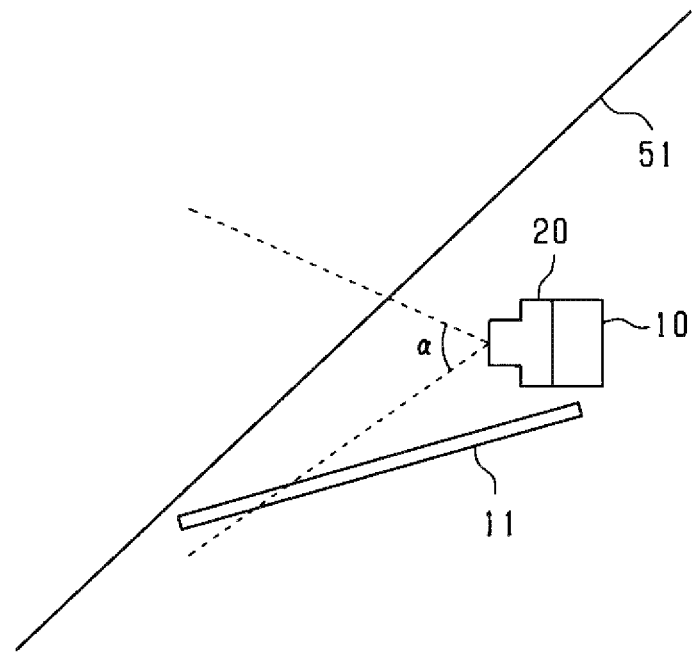
FIG. 4 is also a side view illustrating the camera system from one side thereof according to one embodiment of the present disclosure.

In view of this, according to this embodiment, the control unit 30 corrects the contrast of the camera image in accordance with a degree of whitish blur (cd/m^2) of the camera image. Hence, as shown in FIG. 4, a part of the hood 11 is positioned ahead of the image capture unit 20 within an angle of view a of the image capture unit 20 as a prerequisite structural condition. Accordingly, the hood 11 appears in the camera image captured by the image capture unit 20.

Figure 5:
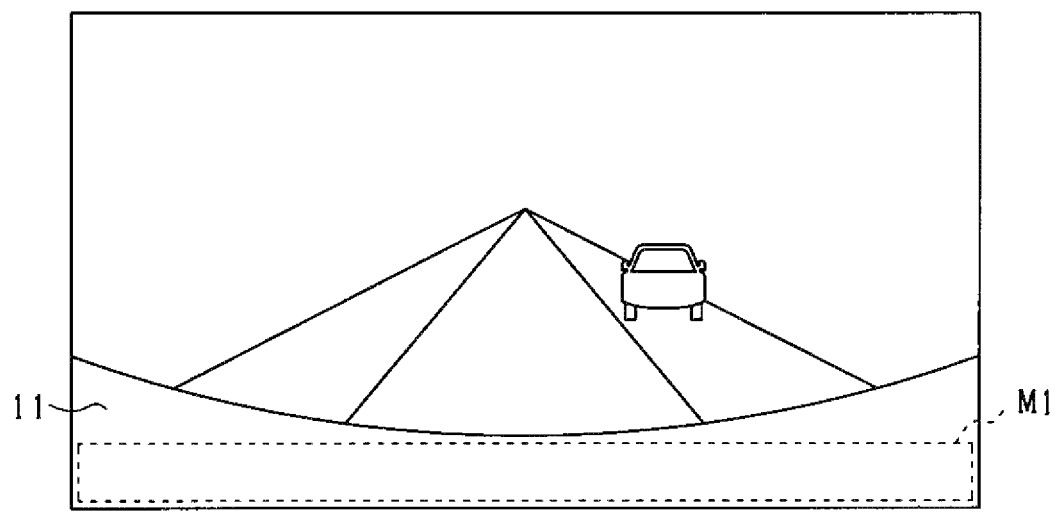
FIG. 5 is a diagram schematically illustrating a camera image captured by an image capture unit according to one embodiment of the present disclosure.

FIG. 5 illustrates a camera image captured by the image capture unit 20. Specifically, in this camera image, a partition line drawn on a road and other vehicles running ahead of the vehicle 50 on the road are captured. At the same time, the hood 11 also appears in a lower part of the camera image.

As described earlier, due to reflection of natural light in both the hood 11 and the inside of the windshield 51, the camera image including the hood 11 shown in FIG. 5 blurs in white (i.e., blurry) when viewed as a whole. In such a situation, however, a degree of the whitish blur of the camera image is proportional to that of intensity of the natural light reflected by the hood 11. Further, the degree of the intensity of the natural light reflected by the hood 11 can be known based on a value of a pixel (e.g., an average of pixel values, herein below the same unless otherwise specified) corresponding to the hood 11 in the camera image.

Further, since a degree of whitish blur of the camera image is substantially equivalent to an amount of light (i.e., flare) reflected by an interior side of a windshield of a vehicle, the degree of the whitish blur of the camera image can be represented by a value of luminance [cd/m^2], wherein cd represents Candela.

In view of this, the control unit 30 calculates the whitish blur degree in accordance with the hood pixel value generated in the camera image and corrects a contrast of the camera image in accordance with the whitish blur degree. Specifically, a luminance acquirer 31 is provided in the control unit 30 and acquires a luminance parameter indicating a degree of luminance of the hood 11 appearing in the camera image. Specifically, the control unit 30 (i.e., the luminance acquirer 31) calculates hood pixel values generated in the camera image and converts the hood pixel values into a value of luminance.

Such a conversion from the hood pixel values into the value of luminance is performed as described below.

Figure 13:
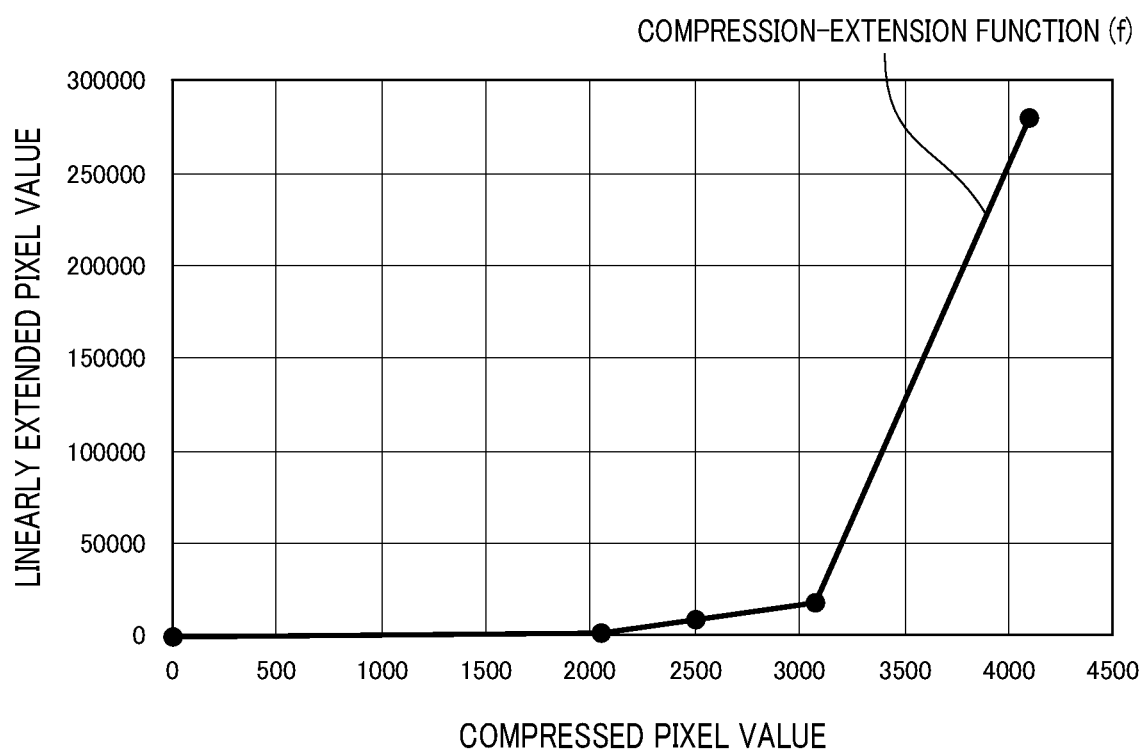
FIG. 13 is a graph illustrating a compression-extension function (f) calculated when a hood pixel value is converted into a value of luminance.

First, a pixel value (e.g., an average of pixel values) corresponding to the hood is linearly converted by using the below described equality shown in FIG. 13, wherein Y represents a linearly extended pixel value (linear pixel value), f represents a compression-extension function which varies in accordance with a setting value, such as a shutter speed, a gain, etc., designated when an image is captured, and X represents a compressed pixel value.

$$Y=f(X)$$

For example, as shown in the drawing, if X (e.g., 2500 value) is located between points as plotted, Y (e.g., 9280 value) is found by interpolating these points.

Then, the linear pixel value of the hood is converted into a luminance of the hood by using the below described formula, wherein A represents a coefficient varying in accordance with the setting value, such as the shutter speed, the gain, etc., designated when the image is captured.

$$\text{Luminance of hood}=A*Y$$

Hence, in this embodiment, the value of luminance of the hood image portion in the camera image acts as the luminance parameter.

More specifically, as shown in FIG. 5, a given region M1 is specified in the camera image corresponding to the hood 11, and the hood pixel value generated in the given region M1 is calculated. In such a situation, the hood pixel value may be calculated by averaging pixel values obtained at multiple points within the given area M1. Otherwise, the hood pixel value can be calculated by averaging hood pixel values generated during a given time period per time.

Figure 6:
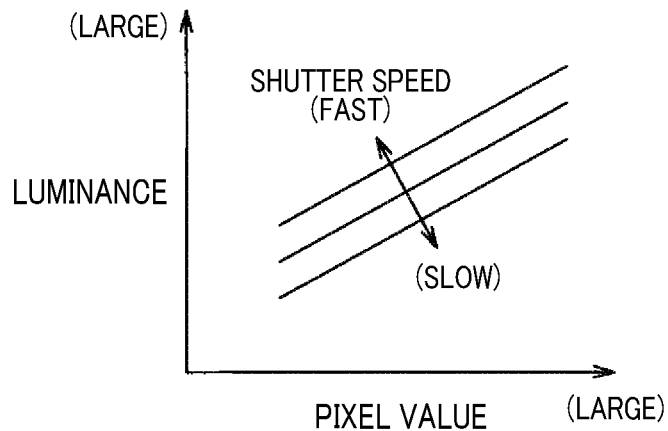
FIG. 6 illustrates a graph illustrating a relation between a hood pixel value (i.e., a pixel value of a hood image) and a value of luminance according to one embodiment of the present disclosure.

Then, the luminance acquirer 31 converts the hood pixel value to a value of luminance based on a relation therebetween as shown in FIG. 6. That is, it is desirable to convert the hood pixel value into the luminance value in accordance with an image capturing condition for controlling the image capture unit 20, such as a shutter speed, a gain, etc. This is because the relation between the hood pixel value and the luminance value changes as the image capturing condition changes. In view of this, multiple relations between the hood pixel value and the luminance value are indicated in FIG. 6, and it is understood therefrom that when the shutter speed is faster, the hood pixel value is converted into a greater luminance value than when the shutter speed is slower even if the hood pixel value is substantially the same. Here, the image capturing condition is designated corresponding to a driver assistance function used in the vehicle 50. Hence, the shutter speed may be faster (i.e., increased) when tracking control of tracking another vehicle is performed in addition to the lane keep control and the pre-crash safety control performed normally than when the tracking control of the other vehicle is not performed but the lane keeping control and the pre-crash safety control are performed. The shutter speed is also desirably increased until right before a time when the vehicle and a road sign to be recognized pass each other to suppress blurring of an image thereof. However, the shutter speed may be slower (i.e., decreased less) than a light emission cycle of an electronic information board that generates pulse emission, when the electric information board is to be recognized.

Further, a whitish blur degree calculator 32 is provided in the control unit 30 and calculates a degree of whitish blur in the camera image in accordance with the luminance value (i.e., parameter) calculated by the luminance acquirer 31. For example, the degree of whitish blur may be calculated by multiplying the luminance value by a given coefficient. In such a situation, since a degree of reflection of natural light in an inner side of the windshield changes in accordance with an angle of inclination of the windshield 51, the given coefficient may be determined in accordance with the angle of inclination of the windshield 51.

Specifically, a degree of whitish blur W (cd/m^2) is represented by the below described equality, wherein B represents of a reflectance coefficient of a windshield of a vehicle varying in accordance with an angle of the windshield, etc.

$$W=\text{Luminance of hood}*B$$

Further, a contrast corrector 33 is provided in the control unit 30 and corrects a contrast of the camera image in accordance with the degree of whitish blur. Specifically, the whitish blur degree is used in correcting the contrast of the camera image as a correction value, and is evenly subtracted from a value of each of the pixels in the entire image.

Figure 7:
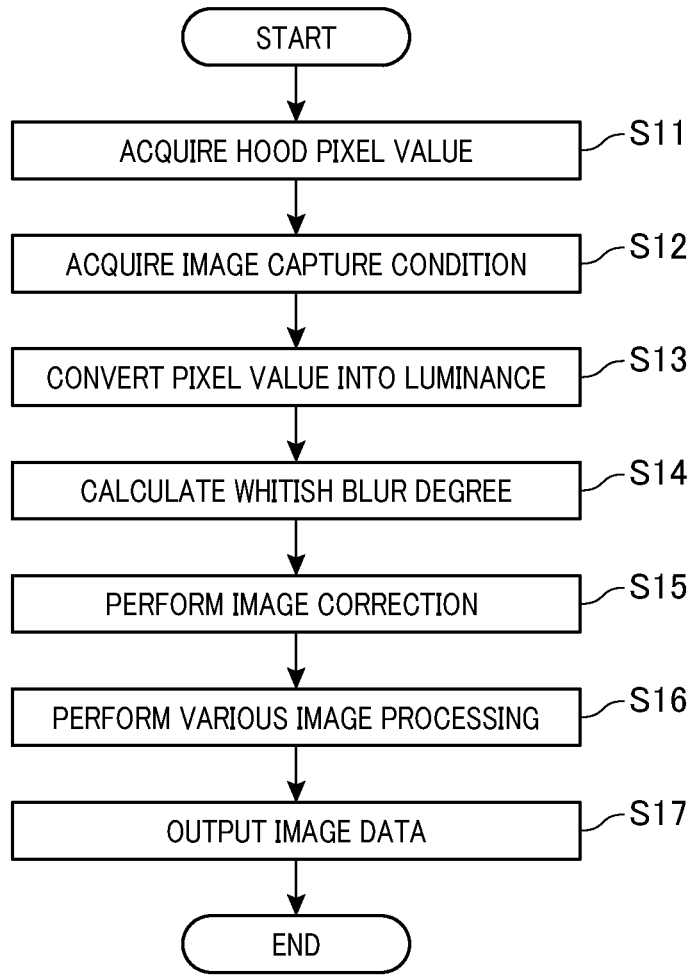
FIG. 7 is a flowchart illustrating a sequence of correcting a contrast of a camera image according to one embodiment of the present disclosure.

Next, an exemplary sequence of correcting a contrast of a camera image will be described herein below with reference to FIG. 7. The control unit 30 repeatedly executes this correction process in a given cycle.

That is, in step S11, the acquirer 31 acquires a hood pixel value from a camera image captured by the image capture unit 20. In step S12, the acquirer 31 acquires an image capturing condition, such as a shutter speed, a gain, etc., used by the image capture unit 20. In the following step of step S13, the hood pixel value is converted into a luminance value in accordance with the image capturing condition acquired in step S12.

Subsequently, in step S14, a whitish blur degree is calculated by multiplying the luminance value calculated in step S13 by a given coefficient. In step S15, the contrast of the camera image is corrected in accordance with the whitish blur degree serving as the correction amount.

Further, in step S16, various image processing, such as noise reduction of reducing a noise of the camera image caused by the shutter speed or the gain and the like, edge emphasis of enhancing light and dark borders of the camera image, etc., are performed. Subsequently, in step S17, image data having been subjected to the contrast correction is output to the driver assistance system 40.

Hence, as described heretofore, according to this embodiment, various advantages can be obtained as will be described herein below.

First, the hood 11 is positioned within the angle of view a of the image capture unit 20. Then, the luminance parameter indicating the degree of luminance of the hood 11 appearing in the camera image is acquired. Subsequently, in accordance with the luminance parameter of the hood 11, the degree of whitish blur of the camera image caused by natural light reflected by both the surface of the hood 11 and the windshield 51, and then entering the camera image, is calculated. Then, the contrast of the camera image is corrected in accordance with the whitish blur degree. As described earlier, the degree of whitish blur is proportional to the intensity of the natural light reflected by the hood 11. In addition, the luminance parameter of the hood 11 in the camera image is also proportional to the intensity of the natural light reflected by the hood 11. Accordingly, the contrast of the camera image can be appropriately restored by correcting the contrast thereof by the whitish blur degree calculated in accordance with the luminance parameter of the hood 11.

Further, as also described earlier, when the camera image blurs in white, a relation between a pixel value of the image of the hood 11 and a luminance value thereof changes in accordance with an image capturing condition, such as a shutter speed, a gain, etc. In view of this, according to this embodiment, since the pixel value is converted into the luminance value in consideration of the image capturing condition, the whitish blur degree can be appropriately calculated.

That is, by changing the image capturing condition in accordance with the driver assistance function, images of a scenery or surrounding of the vehicle can be captured in accordance with an appropriate image capturing condition per driver assistance function.

Herein below, various modifications of the above-described embodiment will be described with reference to FIGS. 8 to 12 and applicable drawings.

Figure 8:
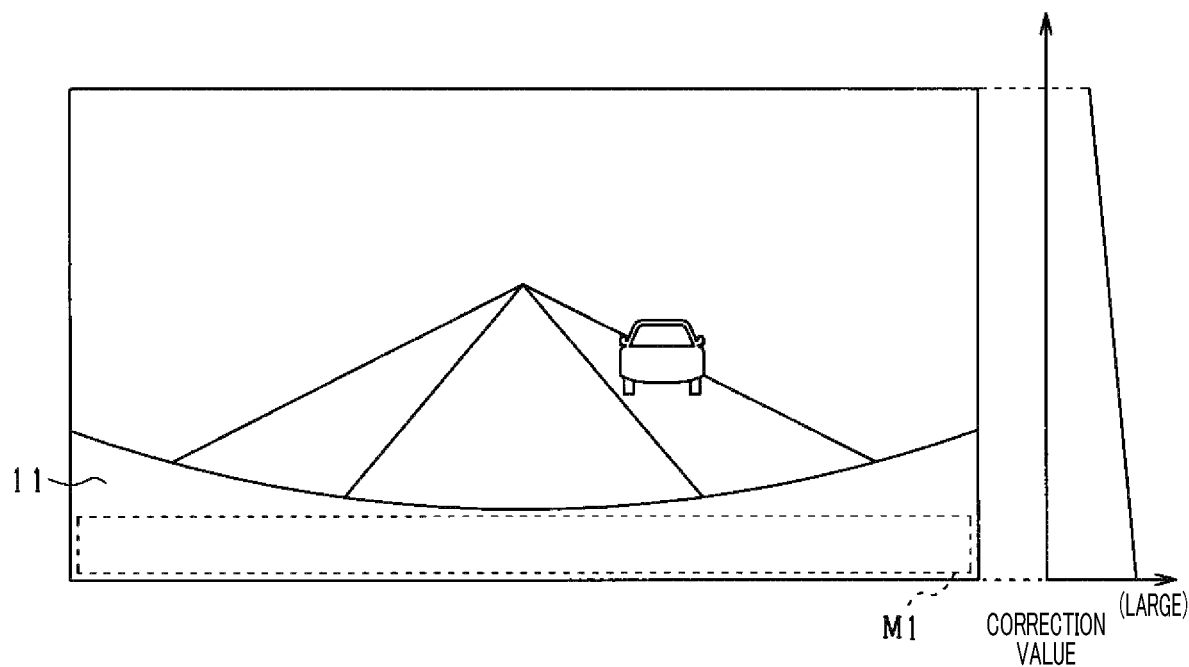
FIG. 8 is diagram illustrating a relation between a vertical position in the camera image and a correction value according to a first modification of the present disclosure.

A first modification will be initially described in detail with reference to FIG. 8 and applicable drawings. In the above-described embodiment, the control unit 30 performs the contrast correction by subtracting substantially the same correction value from the pixel value in each of the pixels of the entire image. However, the present disclosure is not limited thereto and can utilize different correction values instead of such a flat contrast correction value. For example, the control unit 30 may calculate correction values showing a magnitude gradient in a vertical direction of the camera image in proportion to the whitish blur degree. Then, the control unit 30 may correct a contrast of the camera image based on the gradient correction values. That is because it is considered that the upper side of the camera image has less whitish blur. By contrast, the lower side of the camera image is considered to have greater whitish blur. Hence, as shown in FIG. 8, a larger correction value is calculated as a position of the camera image approaches a lower end of the camera image. By contrast, a smaller correction value is calculated as the position of the camera image approaches an upper end of the camera image. Then, contrast correction is performed by subtracting different correction values from pixel values of all pixels in accordance with a vertical position (e.g., an upper side, a lower side) in the camera image.

Specifically, since the windshield 51 is generally inclined from a vertical direction, an upper part of the windshield 51 in front of the image capture unit 20 is accordingly close to the image capture unit 20. By contrast, a lower part of the wind shield 51 in front of the image capture unit 20 accordingly recedes from the image capture unit 20. In such a situation, however, an intensity of a light incident on a pixel located in the upper side of the camera image is likely to be different from that incident on a pixel located in the lower side of the camera image. That is, in general, the larger the angle formed by a light beam from an object and a normal line of the windshield 51, the greater the reflection of the light beam. By contrast, the smaller the angle, the less the reflection of the light beam. Hence, an angle formed by a light beam emitted from the object and reaching the camera image and the normal line of the windshield 51 becomes increasingly relatively smaller as a position of the camera image receiving the light beam approaches the upper side of the camera image. By contrast, an angle formed by a light beam emitted from the object and reaching the camera image and the normal line of the windshield 51 becomes increasingly relatively larger as a position of the camera image receiving the light beam approaches the lower side of the camera image. Hence, the intensity of the light incident on the pixel located in the upper side of the camera image is different from that of the lower side of the camera image. As a result, a difference in degree of whitish blur is likely to occur in the camera image in the vertical direction. In view of this, correction values having an inclination of magnitude in the vertical direction of the camera image are calculated, and a contrast of the camera image is corrected in accordance with the correction values in this modification as described above. Hence, according to this modification, since the correction values can be calculated in accordance with the difference in degree of the whitish blur in the vertical direction in the camera image, the contrast of the camera image can be appropriately corrected.

Next, a second modification will be described herein below in detail with reference to FIG. 9 and applicable drawings. That is, reflection of sunlight by both the hood 11 and the wind shield 51 generates a whitish image in the camera image, for example, when the sunlight arrives at the image capture unit 20 from a front side of the vehicle 50. In other words, reflection of the sunlight by both the hood 11 and the wind shield 51 does not generate the whitish image in the camera image when the sunlight arrives at the image capture unit 20 from a rear side of the vehicle 50.

In view of this, according to this modification, a reference value of a luminance parameter for indicating luminance of a pixel in a camera image corresponding to the hood 11 is calculated when the image capture unit 20 captures images based on sunlight arriving at the image capture unit 20 from the rear side of the vehicle 50 (hereinafter, simply referred to as a rear sunlight). Then, a degree of whitish blur can be calculated based on a luminance parameter of the pixel in a camera image corresponding to the hood 11 periodically calculated during running of a vehicle and the reference value of the luminance parameter.

Here, the reference value of the luminance parameter is a value obtained when the image capture unit 20 is not directly exposed to sunlight. That is, by using a solar radiation sensor 23 acting as a rear sunlight presence determiner or the like as illustrated in FIG. 2, presence or absence of the sunlight directly entering the image capture unit 20 is determined based on an output from the solar radiation sensor or the like, and the reference value is calculated when the sunlight does not directly enter the image capture unit 20.

Such a reference value of the luminance parameter can also be determined during a designing stage. For example, a pixel value corresponding to the food can be previously measured in a phase of product development on condition that sunlight indirectly hits the image capture unit 20 in an ordinary shade and is stored as a parameter.

Here, the rear sunlight means an irradiation condition, in which the sun appears in an opposite direction to a direction in which the image capture unit 20 captures images. In other words, the rear sunlight means an irradiation condition, in which the image capture unit 20 is irradiated with sunlight from behind. By contrast, the front sunlight means an irradiation condition, in which the sun appears in a direction in which the image capture unit 20 captures images. In other words, the front sunlight means an irradiation condition, in which the image capture unit 20 is irradiated with sunlight from a front side thereof.

Figure 9:
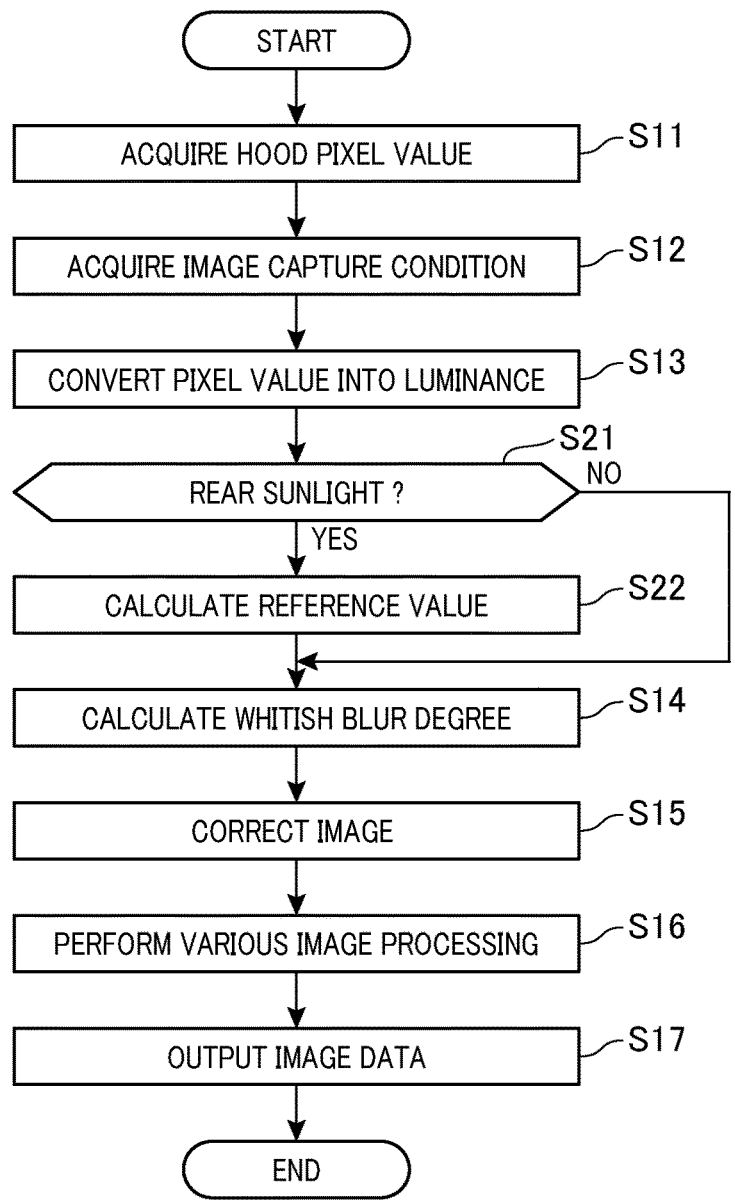
FIG. 9 is a flowchart illustrating a sequence of correcting a contrast of an image according to a second modification of the present disclosure.

FIG. 9 is a flowchart specifically illustrating a sequence of a process performed in this modification. As shown, the process is carried out in place of the above-described process shown in FIG. 7. In the drawing of FIG. 9, the same step number as used in FIG. 7 is assigned to the same process, and the description thereof is not repeated (i.e., omitted) herein below. However, respective processes performed in steps S21 and S22 are newly employed in this modification in addition to all of the steps of FIG. 7 as shown In FIG. 9.

Specifically, as shown in FIG. 9, hood pixel values are obtained and are converted into luminance values in steps S11 to S13. Then, it is determined in step S21 if the rear sunlight condition is present. For example, based on information, such as a current position of the sun, a running direction of the vehicle 50, weather, etc., it is determined if the rear sunlight condition is present. For example, when a current time is around noon, and accordingly the sun is recognized to be located in the south, and it is recognized that the vehicle 50 is running north based on information transmitted from a navigation system, it is determined that the rear sunlight condition is present.

When it is determined in step S21 that the rear sunlight condition is present, the process proceeds to step S22. Then, a current luminance of a pixel in a camera image corresponding to the hood 11 is calculated as the reference value of the luminance parameter. Then, the process proceeds to step S14. By contrast, when it is determined in step S21 that the rear sunlight condition is absent, the process skips step S22 and proceeds to step S14.

Then, in step S14, a degree of whitish blur is calculated based on the luminance value calculated in step S13 (i.e., the luminance value periodically calculated during running of the vehicle) and the reference value calculated in step S22.

Here, when a hood surface becomes whitish due to aging or the like, the whitish blur degree as calculated becomes excessive, and contrast correction is highly likely to be excessively performed. Hence, when the reference value as calculated in step S13 exceeds an upper limit determined in advance, the whitish blur degree as calculated is then corrected by subtracting a given degree therefrom in proportion to an excessive degree in step S14.

More specifically, if the reference value is different from a given suitable value (i.e., upper limit), the whitish blur degree calculated based on the luminance value calculated in step S13 is corrected in accordance with a difference between the reference value and the given suitable value. For example, when a hood surface is whitish due to elapse of time or the like, a degree of whitish blur becomes too large, and a contrast may be excessively corrected. Hence, the degree of whitish blur is reduced thereby being corrected. Then, in step S15, a contrast of the camera image is corrected in accordance with the degree of whitish blur as corrected.

Figure 10:
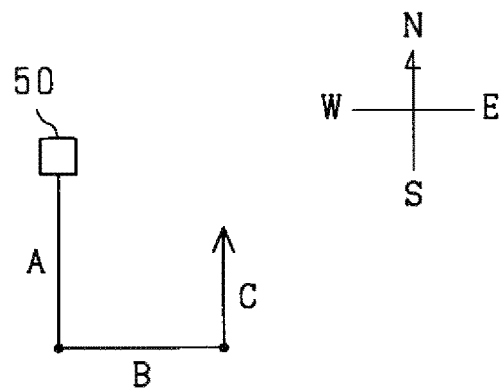
FIG. 10 is a diagram illustrating a running state of a vehicle according to the second modification of the present disclosure.

FIG. 10 illustrates a running state of the vehicle 50, in which a vertical direction indicates a north-south direction, and thus an upper side in the drawing corresponds to north and the lower side south, respectively. Here, as shown, the vehicle 50 travels south in a section A, east in a section B, and north in a section C. In such a situation, a rear sunlight condition is determined to be present when it is determined that weather is fine and the vehicle 50 runs along the section C out of these sections A to C at around noon, for example. Then, a value of luminance of the pixel corresponding to the hood is calculated when the vehicle 50 runs along the section C, and is then designated as the reference value of the luminance parameter. Here, each time the rear sunlight condition is present, the reference value of the luminance parameter is calculated and the reference value is updated.

Hence, according to the second modification, the contrast of the camera image can be appropriately corrected. Because, even if the hood surface becomes whitish due to elapse of time or the like, excessive correction of the contrast of the camera image can be suppressed or reduced.

Figure 11:
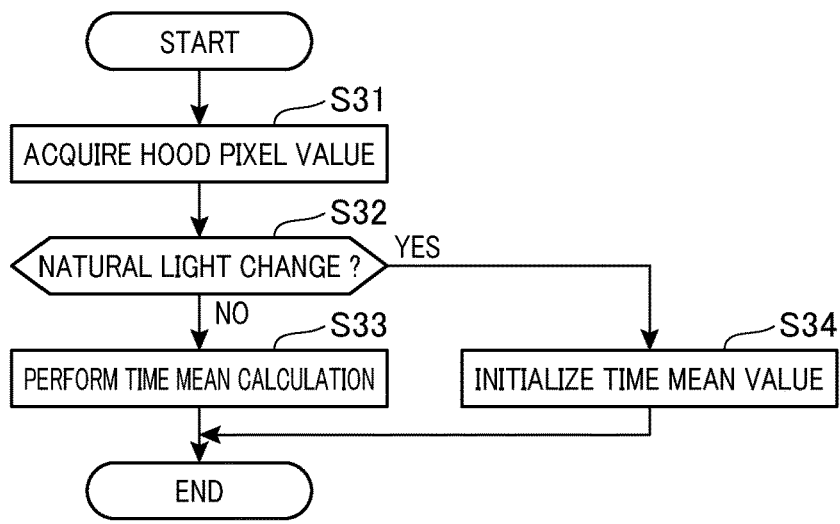
FIG. 11 is a flowchart illustrating a sequence of calculating a time mean value of a hood pixel value according to a third modification of the present disclosure.

Next, a third modification will be described herein below in detail with reference to FIG. 11 and applicable drawings. The above-described time mean value of the luminance parameter may be initialized when a condition of the natural light emitted to the hood 11 is watched and is determined to have changed. A specific sequence of the above-described process of initializing, watching, and determining is shown in FIG. 11 using a flowchart. This process is performed as a subroutine called in step S11 of FIG. 7.

Specifically, in step S31, a current hood pixel value (i.e., a value of a pixel in a camera image corresponding to the hood 11) is acquired. Subsequently, in step S32, it is determined if the natural light emitted to the hood 11 changes. For example, it may be desirably determined that a change in natural light occurs, for example, based on information from the navigation system of presence of either a tunnel entrance or a tunnel exit during running of the vehicle. Otherwise, it may be desirably determined that a change in natural light occurs based on information from the navigation system of presence of a change in running direction of the vehicle.

When it is determined that the natural light has not changed, the process proceeds to step S33, and a hood pixel value is calculated as a time mean value by averaging pixel values calculated during a given period per time. By contrast, when it is determined that the natural light has changed, the process proceeds to step S34 and initializes the time mean value of the hood pixel value.

Accordingly, by calculating the whitish blur degree based on the time mean value of the hood pixel values, unstable calculation of the whitish blur degree can be suppressed or reduced even if the hood pixel value temporarily changes due to noise or the like. Further, since the time mean value of the hood pixel values is initialized when either the vehicle 50 enters and exits the tunnel or the running direction of the vehicle 50 regarding sunlight changes, the time mean value of the hood pixel values can be appropriately calculated, thereby efficiently enabling suppression or reduction of erroneous contrast correction.

Next, a fourth modification will be described herein below in detail with reference to FIG. 12 and applicable drawings. The camera image captured by the image capture unit 20 can be visually recognized by a user in addition to the usage of the driver assistance control. Specifically, the camera image of visual recognition to be used by the user can be stored in a memory, for example, as a driving record of the vehicle 50. In such a configuration, it is desirable that the control unit 30 differently calculates a correction value in accordance with a whitish blur degree and utilizes a different correction value obtained in this way when the control unit 30 corrects a contrast of the camera image for driving support control use from a correction value used when the control unit 30 corrects a contrast of the camera image of visual recognition to be used by the user.

Figure 12:
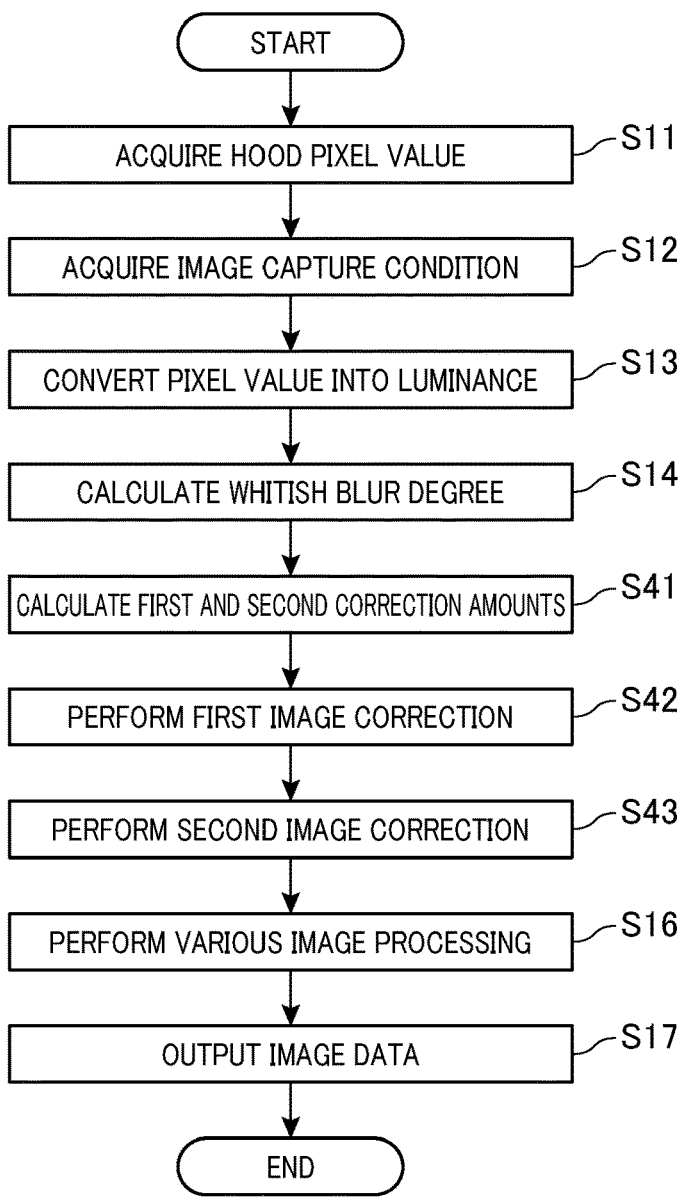
FIG. 12 is a flowchart illustrating a sequence of correcting a contrast of an image according to a fourth modification of the present disclosure.

Such a processing sequence is specifically shown in FIG. 12 by using a flowchart. This processing sequence is carried out in place of the above-described processing sequence of FIG. 7. In FIG. 12, the same process to that performed in FIG. 7 is numbered by the same step number, and the description thereof is not repeated (i.e., omitted). However, as shown in FIG. 12, the step S15 of FIG. 7 is not employed, while steps S41 to S44 are newly employed in addition to the steps except for the step S15 of FIG. 7.

As shown In FIG. 12, in steps S11 to S14, a hood pixel value is obtained and is converted into a value of luminance, and a whitish blur degree is then correspondingly calculated, respectively. Then, the process proceeds to step S41. In step S41, in accordance with the whitish blur degree, a first correction amount used in correcting a contrast of a camera image for driving assistance control use and a second correction amount used in correcting a contrast of a camera image for visual recognition to be used by a user are calculated. Here, the first correction amount and the second correction amount are calculated to be different from each other. For example, since the camera image for driver assistance control is used in white line recognition, object recognition, and the like, it is desirable that a contrast is significantly corrected so that edges of these white lines and objects are emphasized. By contrast, it is desirable that the camera image for user recognition use is not different from an image visually recognized by the user by sight. In view of this, the first correction amount is made to be relatively large, while the second correction amount is made to be relatively small.

Subsequently, in step S42, a camera image for driver assistance control is generated by subtracting the first correction amount from a pixel value in each of the whole pixels in the camera image. Further, in step S44, a camera image for user recognition use is generated by subtracting the second correction amount from the pixel value in each of the whole pixels in the camera image.

Hence, according to the above-described fourth modification, the contrast of the camera image can be appropriately corrected in accordance with usage of the camera image. Further, with the camera image corrected for driver assistance control, the white line recognition and the object recognition or the like can be appropriately performed, thereby ultimately enabling appropriate driver assistance control. Further, with the camera image corrected for visual recognition to be used by the user, a camera image not causing the user visual discomfort can be provided to the user.

Further, it is yet desirable if the user can designate a contrast of the camera image for visual recognition to be used by the user. In such a situation, a magnitude relation between the first correction value and the second correction value may be arbitrarily determined. In addition, the second correction amount can be made greater than the first correction amount.

Further, in the above-described embodiment and various modifications, the luminance is calculated by converting the hood pixel value and is used as the luminance parameter. However, the present disclosure is not limited thereto and the hood pixel value itself can be used as the luminance parameter.

Further, in the above-described embodiment and various modifications, the image capture unit 20 and the control unit 30 are integrated with each other in the camera 10. However, the present disclosure is not limited thereto and the control unit can be separated from the image capture unit 20 to act as an image processing apparatus.

Further, in the vehicle 50, the image capture unit 20 can be configured to capture images of the surroundings other than that in front of the vehicle. For example, the camera 10 can be a rear camera of the vehicle 50 to capture images of surroundings on the rear side of the vehicle.

Further, the control unit 30 and its control method described heretofore in the present disclosure can be realized by a dedicated computer composed of a processor programmed to perform one or more functions specified by computer program, and a memory. Also, the control unit 30 and its control method described heretofore in the present disclosure can be realized by a dedicated computer composed of a processor programmed to perform one or more functions and a memory. Alternatively, the control unit 30 and its control method described heretofore in the present disclosure can be realized by a dedicated computer with a processor composed of one or more dedicated hardware logic circuits. As another alternative, the control unit and its method described heretofore in the present disclosure can be realized by one or more dedicated computers, each of which is composed of a combination of a processor programmed to perform one or more functions, a memory, and a processor composed of one or more hardware logic circuits. Further, the computer program can also be stored in a computer-readable non-transitory tangible recording medium as an instruction executed by the computer.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described image processing system and may be altered as appropriate. Further, the present disclosure is not limited to the above-described camera system and may be altered as appropriate. Further, the present disclosure is not limited to the above-described vehicle and may be altered as appropriate.

What is claimed is:

1. An image processing system used with an in-vehicle camera system, the camera system including:
    an image capture unit to capture images of surroundings of a vehicle as camera images through a windshield of the vehicle; and
    a hood to prevent an interior of the vehicle from being reflected in the windshield and being captured by the image capture unit together with the surroundings of the vehicle, the hood being disposed below the image capture unit and being present in an angle of vision of the image capture unit;

the image processing system comprising:

a luminance parameter acquirer to acquire a luminance parameter indicating a degree of luminance of an image of the hood reflected in the camera image;

a whitish blur degree calculator to calculate a degree of whitish blur generated in the camera image as a whitish blur degree in accordance with the luminance parameter, the whitish blur being generated when natural light is reflected by both the hood and an inner surface of the windshield; and a contrast corrector to correct a contrast of the camera image in accordance with the whitish blur degree.

2. The image processing system as claimed in claim 1, wherein the luminance parameter acquirer converts a pixel value of the hood image included in the camera image to a value of luminance to acquire the luminance parameter, and the whitish blur degree calculator calculates the whitish blur degree in accordance with the value of luminance parameter, wherein the luminance acquirer converts the pixel value into the value of luminance in accordance with an image capturing condition based on which the image capture unit is controlled.

3. The image processing system as claimed in claim 2, further comprising an image capturing condition designator to designate image capturing conditions in accordance with a type of driver assistance function that assists a driver to operate the vehicle, wherein the luminance parameter acquirer converts the pixel value of the hood image into the value of luminance in accordance with the image capturing condition of the image capture unit designated by the image capturing condition designator.

4. The image processing system as claimed in claim 1, wherein the contrast corrector calculates correction values having a magnitude gradient in a vertical direction of the camera image in accordance with the whitish blur degree, the contrast corrector correcting the contrast of the camera image in accordance with the correction values.

5. The image processing system as claimed in claim 1, further comprising:

a rear sunlight presence determiner to determine that a rear sunlight is present when a direction in which the image capture unit captures images is a direction in which sunlight directly enters the vehicle as the rear sunlight from a rear side of the vehicle; and a reference value calculator to calculate a reference value of the luminance parameter of the hood image, only when the image capture unit captures images in the same direction as the rear sunlight;

wherein the whitish blur degree calculator calculates the whitish blur degree in accordance with a difference between the luminance parameter acquired by the luminance parameter acquirer and the reference value calculated by the reference value calculator when the rear sunlight is present.

6. The image processing system as claimed in claim 1, further comprising a natural light condition determiner to determine a condition of natural light with which the hood is irradiated, wherein the luminance parameter acquirer calculates the luminance parameter by obtaining a time mean value of the pixel values in a given time period, and initializes the time mean value of the luminance parameter based on a determination of the natural light condition determiner that the natural light with which the hood is irradiated has changed.

7. The image processing system as claimed in claim 1, wherein the camera images captured by the image capture unit are used in driving support control and visual recognition for a user, wherein the contrast corrector calculates a different correction value to correct the contrast of the camera image for driving assistance control in accordance with the whitish blur degree from a correction value used in correcting the contrast of the camera image for visual recognition performed by the user.

8. An in-vehicle camera system comprising:

an image capture unit to capture images of surroundings of a vehicle as camera images through a windshield of the vehicle;

a hood to prevent an interior of the vehicle from being reflected in the windshield and being captured by the image capture unit together with the surroundings of the vehicle, the hood being disposed below the image capture unit and being present in an angle of vision of the image capture unit; and an image processing system including;

a luminance parameter acquirer to acquire a luminance parameter indicating a degree of luminance of an image of the hood reflected in the camera image;

a whitish blur degree calculator to calculate a degree of whitish blur generated in the camera image as a whitish blur degree in accordance with the luminance parameter, the whitish blur being generated when natural light is reflected by both the hood and an inner surface of the windshield the windshield; and a contrast corrector to correct a contrast of the camera image in accordance with the whitish blur degree.

9. A vehicle having an automatic driving function and a drive recorder, the vehicle comprising:

an in-vehicle camera system disposed in a cabin close to a windshield, the camera system including:

an image capture unit to capture images of surroundings of a vehicle as camera images through a windshield of the vehicle;

a hood to prevent an interior of the vehicle from being reflected in the windshield and being captured by the image capture unit together with the surroundings of the vehicle, the hood being disposed below the image capture unit and being present in an angle of vision of the image capture unit; and an image processing system including;

a luminance parameter acquirer to acquire a luminance parameter indicating a degree of luminance of an image of the hood reflected in the camera image;

a whitish blur degree calculator to calculate a degree of whitish blur generated in the camera image as a whitish blur degree in accordance with the luminance parameter, the whitish blur being generated when natural light is reflected by both the hood and an inner surface of the windshield; and a contrast corrector to correct a contrast of the camera image in accordance with the whitish blur degree.

* * * * *